2,891,969
2,3-EPOXYALDEHYDE ACYLALS

Benjamin Phillips, Charleston, and Donald L. Heywood, South Charleston, W. Va., assignors to Union Carbide Corporation, a corporation of New York No Drawing. Application March 27, 1957
Serial No. 648,776

12 Claims. (Cl. 260—348)

This invention relates to 2,3-epoxyaldehyde acylals and, more particularly, to unsubstituted and aryl-substituted 2,3-epoxyalkane-1,1-diol diacylates.

Our 2,3-epoxyaldehyde acylals, hereinafter referred to also as the epoxides, are composed of carbon, hydrogen and oxygen and can be represented by the formula:

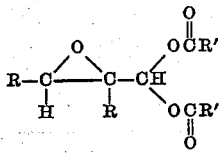

wherein the R's represent members selected from the group consisting of hydrogen, alkyl groups wherein the sum of the carbon atoms contained in said R's is an integer in the range of 0 to 15, and phenyl groups; and R' represents members selected from the group consisting of alkyl groups containing 1 to 18 carbon atoms and phenyl groups. The R groups need not be the same throughout the same molecule. Preferred epoxides are those represented by the foregoing formula wherein each R' group contains not more than 18 carbon atoms, the combined number of carbon atoms contained by both R groups is an integer from 0 to 15 and aromatic groups, if any, contained thereby are monocyclic. Unsubstituted and aryl-substituted 2,3-epoxyalkane-1,1-diol dialkanoates and 2,3-epoxyalkane-1,1-diol diaroylates are also preferred. As represented by the foregoing formula, the 2,3-epoxyalkane-1,1-diol dialkanoates are those in which the R' groups are alkyl; the 2,3-epoxyalkane-1,1-diol diaroylates are those in which the R' groups are aryl; the unsubstituted 2,3-epoxyalkane-1,1-diol dialkanoates or diaroylates are those in which the R groups are hydrogen or alkyl; and the aryl-substituted 2,3-epoxyalkane-1,1-diol dialkanoates or diaroylates are those in which the R groups are hydrogen or aryl, at least one R group being aryl. The unsubstituted and aryl-substituted 2,3-epoxyalkane-1,1-diol dialkanoates are particularly preferred.

Our epoxides are useful in the manufacture of a variety of glyceraldehydes. By hydrolyzing the epoxides in the presence of acid catalysts unsubstituted and substituted glyceraldehydes can be readily produced. These glyceraldehydes are particularly important as reactants or modifiers in the production of phenolic resins. Our epoxides are also valuable as heat and light stabilizers for chlorine-containing resins such as polyvinyl chloride, polyvinylidene chloride and chlorinated rubbers.

The 2,3-epoxyaldehyde acylals of this invention can be prepared by the epoxidation of the olefinic double bonds of corresponding unsubstituted or aryl-substituted 2-alkene-1,1-diol diacylates using suitable epoxidizing agents. Typical epoxidizing agents are the peracids, e.g., peracetic acid, perpropionic acid, perbenzoic acid and the like or the aldehyde monoperacylates, e.g., acetaldehyde monoperacetate and propionaldehyde monoperpropionate. Of these epoxidizing agents the 2 to 3 carbon aliphatic peracids, particularly, peracetic acid, and the 2 to 3 carbon aliphatic aldehyde mono-(2 to 3 carbon aliphatic)-peracylates, particularly, acetaldehyde monoperacetate, are preferred mainly from the aspects of being commercially available and capable of producing commercially acceptable yields. The epoxidation, using a peracid, of the 2-alkene-1,1-diol diacylate starting material can be represented by the equation:

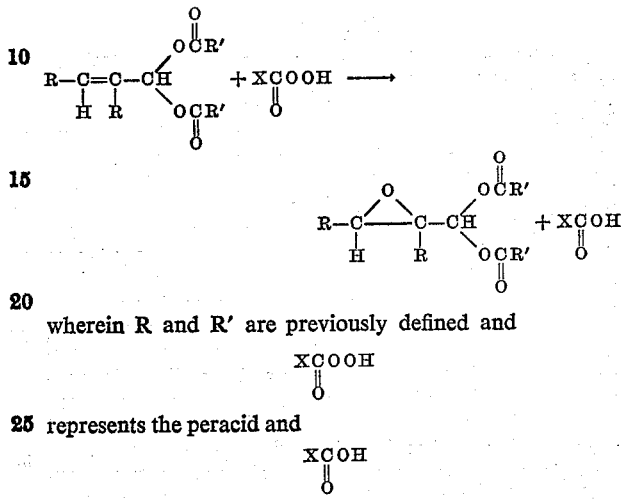

wherein R and R' are previously defined and $$X\overset{O}{\underset{\|}{C}}OOH$$

represents the peracid and $$X\overset{O}{\underset{\|}{C}}OH$$

the peracid residue after epoxidation. Epoxidation employing an aldehyde monoperacylate takes place in a similar manner. Many epoxidizing agents in crystalline form or highly concentrated solutions are highly explosive when exposed to physical shocks, sometimes of the very slightest magnitude. Possible explosion hazards are avoided by preventing the formation of crystalline forms or highly concentrated solutions of epoxidizing agent. This can be safely accomplished by employing in the epoxidation solutions containing below about 60 weight percent of epoxidizing agent. Ethyl acetate and acetone are two of the many solvents available for peracetic acid or acetaldehyde monoperacetate. It is particularly important that the epoxidation be carried out in the absence of heavy metal ions or strong acids and water so as to avoid the hydrolysis of the easily hydrolyzable 2-alkene-1,1-diol diacylate starting materials and the products.

The epoxidation is advantageously carried out at temperatures in the range of —10° C. to 100° C. At temperatures below this range epoxidation takes place at a very slow rate and above this range side reactions produce undesired materials and reduce the yield. Molar ratios of epoxidizing agent to 2-alkene-1,1-diol diacylate starting material can be varied over a wide range, for example, from 0.4 to 2.0, with molar ratios between 0.8 and 1.2 being preferred, however. Molar ratios above 2.0 may be employed, although the formation of other materials brought about by such higher ratios may require extensive separation methods. Molar ratios below 0.4 may also be employed but the low yield of product makes the use of such ratios impractical. The epoxidation time required to produce our 2,3-epoxyaldehyde acylals will depend upon the epoxidation temperature, the molar ratios employed and the yield desired. Any suitable method for isolating the product, such as, fractionation, crystallization and the like can be employed.

The starting materials, 2-alkene-1,1-diol diacylates, can be prepared by any suitable method, many of which are known in the art. An advantageous method for preparing the starting materials involves the reaction of the corresponding unsubstituted or aryl-substituted 2-alkene aldehyde with the corresponding monocarboxylic acid anhydride in the presence of an acid catalyst such as a one to one molar mixture of boric acid and oxalic acid, This reaction is advantageously conducted at temperatures at or near room temperatures, for example, in the range from −20° C. to about 100° C.

The preparation of starting materials, the unsaturated acylals, are described more fully in co-pending application Serial No. 574,615, filed March 29, 1956, which is hereby incorporated by reference. Several such compounds also appear in Beilstein: Allylidene diacetate and crotylidene diacetate (Beilstein, 4th ed., vol. 2, p. 154), cinnamylidene diacetate (Beilstein 4th ed., vol. 7, p. 354).

The following examples illustrate the invention:

*Example 1*

A mixture containing 217 grams (2.125 moles) of acetic anhydride and 0.34 gram of an equimolar mixture of boric acid and oxalic acid as catalyst was prepared. To this mixture 139 grams (1.417 moles) of 2-ethylcrotonaldehyde was added continusouly over a period of 35 minutes. The solution was stirred constantly and cooled somewhat to maintain a temperature of 30° C. The reaction mixture was allowed to stand for an additional 20 hours after which time the catalyst was neutralized with 0.93 gram of sodium acetate. The neutralized reaction mixture was fractionated to produce 212 grams of 2-ethyl-2-butene-1,1-diol diacetate having a boiling point of 88° C. to 90° C. under a reduced pressure of 4 millimeters of mercury and a sodium light index of refraction of 1.4339 at 30° C. A carbon-hydrogen analysis conducted in the conventional manner yielded the following results: Calculated for $C_{10}H_{16}O_4$, carbon—60 weight percent, hydrogen—8 weight percent; and experimentally determined, carbon—60.6 weight percent, hydrogen—8.2 weight percent.

*Example 2*

To 200 grams (1.0 mole) of 2-ethyl-2-butene-1,1-diol diacetate there were added 396 grams of a 23 weight percent peracetic acid solution in ethyl acetate. The total amount of peracetic acid added was 91.2 grams or 1.2 moles. The temperature of the reaction mixture was maintained at 60° C. for a total reaction time of 4 hours. The reaction mixture was stirred throughout the entire reaction. At the end of 4 hours, the reaction mixture was cooled to room temperature and fed into ethylbenzene refluxing at a reduced pressure of 30 to 40 millimeters of mercury. Low boiling materials were removed from the refluxing mixture. Fractionation of the residue provided 119 grams of 2,3-epoxy-2-ethylbutane-1,1-diol diacetate having a boiling point of 95° C. to 96° C. at a reduced pressure of 3 millimeters of mercury and a sodium light refractive index of 1.4289 at 30° C. The yield of product amounted to 55 percent of theoretical. A carbon-hydrogen analysis conducted in the usual manner provided the following results: Calculated for $C_{10}H_{16}O_5$, carbon—55.6 weight percent, hydrogen—7.41 weight percent; and experimentally determined, carbon—55.5 weight percent, hydrogen—7.4 weight percent.

*Example 3*

To a mixture containing 153 grams (1.5 moles) of acetic anhydride and 0.227 gram of an equimolar mixture of boric acid and oxalic acid as catalyst there were added, over a period of 3 hours, 126 grams (1.0 mole) of 2-ethyl-3-propylacrolein. The temperature of the reaction mixture was maintained at 24° C. to 30° C. during the addition and for 19 additional hours after completion of aldehyde addition. The catalyst then was neutralized with 0.62 gram of sodium acetate and the reaction mixture was fractionated to provide 175 grams of 2-ethyl-2-hexene-1,1-diol diacetate having a boiling point of 91° C. to 95° C. at a reduced pressure of 2 millimeters of mercury and a sodium light refractive index of 1.4366 at 30° C. A carbon-hydrogen analysis was conducted using conventional techniques and provided the following results: Calculated for $C_{12}H_{20}O_4$, carbon—63.2 weight percent, hydrogen—8.76 weight percent; experimentally determined, carbon—63.5 weight percent, hydrogen—8.8 weight percent.

*Example 4*

Over a period of 4 hours, 927 grams of a 24 weight percent peracetic acid solution in ethyl acetate was continuously added to 551 grams (2.417 moles) of 2-ethyl-2-hexene-1,1-diol diacetate. The amount of peracetic acid added was 223 grams or 2.924 moles. The reaction temperature was maintained at 65° C. to 70° C. during the peracetic acid addition. The reaction mixture was vigorously stirred during the entire period of 7 hours. Titration for peracetic acid indicated that more than the theoretical amount of peracetic acid had been consumed. The reaction mixture then was cooled to room temperature and fed into ethylbenzene refluxing at 30 to 40 millimeters of mercury reduced pressure. Ethylbenzene, acetic acid and ethyl acetate were removed leaving a residue which was fractionated. After the fractionation 425 grams of 2,3-epoxy-2-ethylhexene-1,1-diol diacetate having a boiling point of 102° C. to 103° C. at a reduced pressure of 1.25 millimeters of mercury, and a sodium light refractive index of 1.4308 at 30° C. were obtained. Carbon-hydrogen analysis in accordance with conventional techniques provided the following results: Calculated for $C_{12}H_{20}O_5$, carbon—59 weight percent, hydrogen—8.2 weight percent; experimentally determined, carbon—59.2 weight percent, hydrogen—7.9 weight percent.

*Example 5*

Two-hundred and thirty-two grams (2.272 moles) of acetic anhydride containing 0.344 gram of an equimolar mixture of boric acid and oxalic acid as catalyst had added thereto 200 grams (1.51 moles) of cinnamaldehyde over a period of 1.75 hours. During this addition 50 milliliters of benzene was added to dissolve any solids which formed. The reaction mixture was continuously stirred and sufficiently cooled to maintain a reaction temperature of 30° C. After completion of the cinnamaldehyde addition the reaction mixture was allowed to stand at room temperature for 19 additional hours. The reaction mixture was then cooled to 7° C. and filtered. There was obtained 369 grams of dark, fluffy crystals. These crystals were recrystallized from benzene to provide substantially white, crystalline 3-phenyl-2-propene-1,1-diol diacetate which melted between 78° C. and 80° C.

*Example 6*

To 117 grams (0.5 mole) of 3-phenyl-2-propene-1,1-diol diacetate there were added over a period of 1.5 hours 177 grams of a 25.7 weight percent peracetic acid solution in ethyl acetate. The amount of peracetic acid added was 45.6 grams or 0.6 mole. The temperature of the reaction mixture was maintained at 60° C. for the addition of peracetic acid solution and for an additional 3.5 hours. The reaction mixture was stirred vigorously for the entire time of 5 hours. Titration for peracetic acid indicated that 105.5 percent of theoretical peracetic acid had been consumed. The reaction mixture was then stored for 17 days at −8° C. After this time, there was obtained 44 grams of flaky, substantially white crystals having a melting point of 74.5° C. to 78.5° C. These crystals were recrystallized twice from ethanol and provided crystalline 3-phenyl-2,3-epoxypropane-1,1-diol diacetate having a melting point of 74.5° C. to 78.5° C. Infrared analysis indicated a strong oxirane band. band.

*Example 7*

A mixture of 86 grams (0.5 mole) of 2-methyl-2-propene-1,1-diol diacetate and 1 gram of hydroquinone inhibitor was continuously stirred at a temperature of 50° C.. to 58° C. while 390 grams of a 14.8 weight percent peracetic acid solution in ethyl acetate were fed into said mixture over a period of 1.5 hours. The total amount of peracetic acid added was 0.6 mole. The temperature of the resulting reaction mixture was raised to 75° C. to 85° C. and held thereat for 2.5 hours. Titration for peracetic acid at the end of this period indicated that all of the added peracetic acid had been consumed. The reaction mixture was stripped under reduced pressure to a kettle temperature of 55° C. at five millimeters of mercury. A residue representing 2,3-epoxy-2-methylpropane-1,1-diol diacetate was obtained. The product had a sodium light refractive index of 1.4252 at 30° C. and a specific gravity of 1.141 at 20° C. The yield of 2,3-epoxy-2-methylpropane-1,1-diol diacetate was 92 percent of theoretical based on the 2-methyl-2-propene-1,1-diol diacetate charged.

The preceding examples illustrate the methods which can be employed in preparing typical epoxides of this invention. Similar epoxidations can be performed on unsubstituted and aryl-substituted 2-alkene-1,1-diol diacylate starting materials other than those shown in the examples with, however, the replacement of the specific 2-alkene-1,1-diol hydrocarbon dicarboxylate starting material, respectively, by 2-octadecene-1,1-diol distearate, 2-octadecene-1,1-diol dibutyrate, 2-nonyl-2-nonene-1,1-diol dibenzoate, 2,3-diphenyl-2-propene-1,1-diol di(2-ethylhexanoate), 2-phenyl-2-butene-1,1-diol di(phenylacetate), 2-methyl-3-phenyl-2-propene-1,1-diol di(6-phenyl-n-caproate), 2-propene-1,1-diol diacetate, 3-methyl-2-propene-1,1-diol diacetate and 3-methyl-2-propene-1,1-diol dipropionate to produce, respectively, 2,3-exopyoctadecane-1,1-diol distearate, 2,3-epoxyoctadecane-1,1-diol dibutyrate, 2-nonyl-2,3-epoxynonane-1,1-diol dibenzoate, 2,3-diphenyl-2,3-epoxypropane-1,1-diol di(2-ethylhexanoate), 2-phenyl-2,3-epoxybutane-1,1-diol di(phenylacetate), 2-methyl-3-phenyl-2,3-epoxypropane-1,1-diol di(6-phenyl-n-caproate), 2,3-epoxypropane-1,1-diol diacetate, 2,3-epoxy-3-methylpropane-1,1-diol diacetate and 2,3-epoxy-3-methylpropane-1,1-diol dipropionate. Molar ratios of peracetic acid to the respective 2-alkene-1,1-diol diacylate starting material, reaction temperatures and approximate reaction times are essentially the same as those of the epoxidations set forth in the above examples. Isolations of products are conducted by procedures which are similar to the separation procedures described in the above examples or by any other suitable separation methods. The percent yields and purities of products are of the same approximate magnitude as the yields and purities obtained by the epoxidations shown in the examples.

What is claimed is:
1. 2,3-epoxy-2-ethylbutane-1,1-diol diacetate.
2. 2,3-epoxy-2-ethylhexane-1,1-diol diacetate.
3. 2,3-epoxy-3-phenylpropane-1,1-diol diacetate.
4. 2,3-epoxypropane-1,1-diol diacetate.
5. 2,3-epoxy-2-methylpropane-1,1-diol diacetate.
6. An unsubstituted 2,3-epoxyalkane-1,1-diol diacylate having the formula:

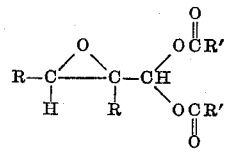

wherein the R's represent members selected from the group consisting of hydrogen, alkyl groups wherein the sum of the carbon atoms contained in said R's is an integer in the range of 0 to 15, and phenyl groups; and R' represents members selected from the group consisting of alkyl groups containing 1 to 18 carbon atoms and phenyl groups.
7. An unsubstituted 2,3-epoxyalkane-1,1-diol dialkanoate.
8. A 3-phenyl-substituted 2,3-epoxyalkane-1,1-diol dialkanoate.
9. An unsubstituted 2,3-epoxyalkane-1,1-diol dibenzoate.
10. An unsubstituted 2,3-epoxy-3-alkylpropane-1,1-diol dialkanoate.
11. An unsubstituted 2,3-epoxy-2-phenylpropane-1,1-diol dialkanoate.
12. An unsubstituted 2,3-epoxy-2,3-diphenylpropane-1,1-diol dialkanoate.

No references cited.